(12) United States Patent
Kiriakou et al.

(10) Patent No.: US 7,828,365 B2
(45) Date of Patent: Nov. 9, 2010

(54) WINDOW ARRANGEMENT FOR A MOTOR VEHICLE

(75) Inventors: Wassilios Kiriakou, Gemmrigheim (DE); Jochen Haas, Freiberg (DE); Thomas Mett, Döhlau (DE); Claus-Christian Steeg, Oelsnitz (DE)

(73) Assignee: Richard Fritz GmbH & Co. KG, Besigheim (DE)

( * ) Notice: Subject to any disclaimer, the term of this patent is extended or adjusted under 35 U.S.C. 154(b) by 0 days.

(21) Appl. No.: 12/204,321

(22) Filed: Sep. 4, 2008

(65) Prior Publication Data
US 2009/0066113 A1    Mar. 12, 2009

(30) Foreign Application Priority Data
Sep. 7, 2007    (DE) .................. 10 2007 042 575

(51) Int. Cl.
*B60J 7/00*    (2006.01)
(52) U.S. Cl. .................. 296/146.1; 296/56; 296/146.8; 296/146.3
(58) Field of Classification Search .................. 296/56, 296/146.8, 146.2, 146.3, 146.1
See application file for complete search history.

(56) References Cited

U.S. PATENT DOCUMENTS
4,822,098 A * 4/1989 Vogt et al. ................ 296/146.5
4,880,267 A * 11/1989 Ohya ........................ 296/56

FOREIGN PATENT DOCUMENTS
DE           40 08 702 A1    9/1991
JP           5-310043         * 11/1993

* cited by examiner

*Primary Examiner*—Joseph D Pape
(74) *Attorney, Agent, or Firm*—Foley & Lardner LLP

(57) ABSTRACT

The present invention relates to a window arrangement for a motor vehicle, comprising a window pane and a trim element arranged on each side of the window pane. In order to improve the conventional window arrangement of the generic type to the effect that mounting can be made easier while the appearance is improved visually and esthetically, the invention provides that the trim elements and the window pane are connected to one another in a materially joined and/or frictionally locking fashion.

18 Claims, 6 Drawing Sheets

WINDOW ARRANGEMENT FOR A MOTOR VEHICLE

CROSS-REFERENCE TO RELATED PATENT APPLICATIONS

The right of foreign priority is claimed under 35 U.S.C. §119(a) based on Federal Republic of Germany Application No. 10 2007 042 575.0, filed Sep. 7, 2007, the entire contents of which, including the specification, drawings, claims and abstract, are incorporated herein by reference.

BACKGROUND OF THE INVENTION

The present invention relates to a window arrangement for a motor vehicle as claimed in the preamble of claim 1.

A window arrangement of the generic type is known from document DE 40 08 702 A1. This document discloses a window arrangement with an attachment angle which is plugged onto the edge of a window pane and which has securing components for attachment to a vehicle structure and a frame produced by encapsulation by injection molding.

SUMMARY OF THE INVENTION

The invention is based on the object of improving the conventional window arrangement of the generic type to the effect that mounting can be made easier while the appearance is improved visually and esthetically.

In order to achieve the object on which the invention is based, the invention provides the window arrangement for a motor vehicle as claimed in claim 1. The trim elements have functionally separate profile sections which are configured and shaped in an optimum way in accordance with their respective function. In this context, the trim elements can form a visually and esthetically appealing aerodynamic transition between lateral paneling of the vehicle and the window pane which is preferably used as a rear window of the vehicle. As a result of the measures according to the invention, the trim elements and the window pane are connected, irrespective of the unavoidable differences in shape of the window pane, to form a pre-assembled unit, with a fluid transition, which is excellent in terms of visual and esthetic appearance, being formed at the connecting point between the window pane and the trim element. Furthermore, the pre-assembled unit can be attached to the vehicle structure in a single mounting step while maintaining the excellent appearance, and therefore can be attached significantly more easily than the conventional window arrangement.

It may prove helpful if the trim element is integrally molded on, preferably injection molded on, to the window pane. A considerable difference in shape of the window pane can therefore be compensated for in a particularly convenient way, and the connecting point is simultaneously sealed.

It may prove advantageous if the trim element is bonded onto the window pane. This brings about a durable and sealed connection between the window pane and trim element.

It may be advantageous if the trim element is plugged onto the window pane. No separate devices are required for this.

In addition, it may prove favorable if an outer surface of the window pane merges with an outer surface of the trim element in a flush fashion. A transition between the window pane and trim element is embodied in a particularly esthetically attractive way, and when there is a flow around the window arrangement air eddies are not produced at the connecting point of the window pane and trim element.

It proves favorable if the connecting section engages around the edge of the window pane with the result that two limbs of the connecting section extend along the window pane on opposite sides of the window pane. The limbs of the connecting section define a receptacle for an edge-side section of the window pane. The plugging-in depth of the window pane in the receptacle is varied depending on the difference of the window pane from the standard size, in order to compensate for a difference in shape of the window pane.

It can also be helpful if the limbs of the connecting section are of approximately equal length. This provides a particularly visually and esthetically appealing result.

It may be advantageous if an adhesive is introduced into a receptacle formed between the limbs of the connecting section. As a result, the position of the window pane with respect to the trim element is secured (positional securement), and on the other hand the connecting point between the window pane and trim element is sealed.

It may be useful if the attachment section is embodied in such a way that it can be secured to the vehicle structure in a positively locking and/or materially joined fashion. Only a small degree of expenditure on mounting is then necessary to mount the trim element on the vehicle structure.

It may be practical if the attachment section has a sprung attachment means which can be latched to the vehicle structure. As a result, the attachment section can be secured to the vehicle structure without separate devices.

It may be advantageous if the attachment section is embodied and can be arranged in such a way that it engages behind the vehicle structure in a positively locking fashion. This embodiment constitutes a further advantageous alternative way of securing the attachment section to the vehicle structure with little expenditure on mounting and without separate devices.

A window arrangement in which the outer surfaces of the connecting section and of the main section merge with one another in an essentially flush fashion may also be advantageous. When there is a flow around this window arrangement, air eddies are not generated, or are only generated to a small degree.

A window arrangement in which a transition section, which is preferably aligned parallel to the longitudinal axis of the vehicle, extends between the connecting section and the main section can also be economical. As a result, the slip stream of the vehicle is reduced.

A window arrangement in which the transition section merges with the main section of the trim element at an acute angle and forms a sharp breakaway edge can be particularly economical. This measure improves the aerodynamics of the vehicle even further, and this also has a positive effect on the fuel consumption of the vehicle.

A further embodiment of the invention relates to an arrangement for a motor vehicle, comprising a window arrangement and a vehicle structure component, wherein the window pane and the vehicle structure component are connected in a materially joined fashion, and wherein the trim element and the vehicle structure component are connected in a positively locking and/or materially joined fashion. This measure has the advantage that only a small degree of expenditure on mounting is necessary to connect the described arrangement to the vehicle structure, and at the same time deviations in shape of the window pane are compensated.

It may be advantageous if the window pane and a vehicle structure component are bonded with an adhesive, wherein the trim element engages behind the vehicle structure component in a positively locking fashion, and/or the trim element and the vehicle structure component are connected with a double-sided adhesive strip. Only a particularly low degree of expenditure on mounting is required to connect the described arrangement to the vehicle structure, while compensating for differences in shape of the window pane.

It may prove useful if the arrangement is embodied as a tailgate for a motor vehicle and comprises two trim elements which are arranged laterally on the window pane and are connected to the window pane in a materially joined and/or frictionally locking fashion. This arrangement can easily be connected to the bodywork of a vehicle.

It may prove practical if the trim elements are embodied and arranged in a mirror-inverted fashion. This arrangement has a particularly harmonic effect in terms of the visual and esthetic appearance.

A further embodiment of the invention relates to a method for manufacturing the window arrangement for a motor vehicle, comprising the steps: preparation of the window pane; integrally molding, bonding or plugging the trim element onto the window pane with the result that the trim element and the window pane are connected in a materially joined and/or frictionally locking fashion. This measure has the advantages mentioned at the beginning.

It may prove advantageous if a primer is applied locally to the window pane before the trim element is integrally molded on. This measure improves the adhesion between the window pane and the trim element.

The preferred exemplary embodiments of the present invention will be described below with reference to the appended drawings.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

The common features of all the exemplary embodiments of the invention will be explained in advance before details are given on the particular features of the individual exemplary embodiments.

The invention relates to a window arrangement 1 for a motor vehicle, comprising a window pane 2 and a trim element 3 arranged on each side of the window pane 2. According to the invention, the trim element 3 and the window pane 2 are connected to one another in a materially joined and/or frictionally locking fashion. In this context, the trim element 3 is preferably integrally molded on, preferably integrally injection molded on, to the window pane 2, or bonded or plugged onto the window pane 2.

The window pane 2 is preferably manufactured from glass or plastic. The preferred thickness of the window pane 2 is approximately 3 mm to 5 mm. When the window pane 2 is manufactured, the fabrication tolerance is approximately 2 mm in the plane of extent of the window pane 2.

The trim element 3 is fabricated in one piece and has a connecting section 131 which is connected to the window pane 2, an attachment section 132 which can be connected to a vehicle structure 5, and a main section 133 which extends between the connecting section 131 and the attachment section 132.

The connecting section 131 serves to connect the window pane 2 to the trim element 3 and can be implemented in three different variants.

The attachment section 132 serves to connect the trim element 3 to the vehicle structure 5 and can also be implemented in three different variants. In this context, the attachment section 132 is preferably embodied in such a way that it can be secured to the vehicle structure 5 in a positively locking and/or materially joined fashion. In this context, the attachment section 132 is embodied in such a way that the trim element 3 can be caulked, clipped, bonded or screwed to the vehicle structure 5. In addition, all other conventional attachment methods are suitable.

The main section 133, which connects the connecting section 131 and the attachment section 132, has, when viewed in cross section, a curvature which preferably describes an arcuate segment (approximately 30°-60° arc length). The main section 133 can be implemented in two different variants and has different functions assigned to it here.

The claimed and described window arrangement 1 is a component of an arrangement for a motor vehicle which is embodied, in particular, as a vehicle tailgate. This arrangement comprises said window arrangement and a vehicle structure component 5. The window pane 2 and the vehicle structure component 5 are connected here in a materially joined fashion, and the trim element 3 and the vehicle structure component 5 are connected in a positively locking and/or materially joined fashion. In particular, the window pane 2 and the vehicle structure component 5 are bonded by means of a bead 6 of adhesive, while the trim element 3 engages behind the vehicle structure component 5 in a positively locking fashion, and/or the trim element 3 and the vehicle structure component 5 are either connected with a double-sided adhesive strip or screwed.

Figure 1:
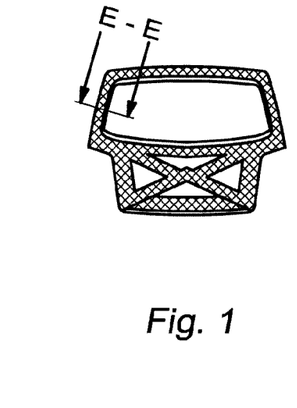
FIG. 1 shows a structure drawing of a vehicle tailgate defining the profile of section E-E.

The vehicle structure or the vehicle structure component 5 forms the frame of the tailgate illustrated in FIG. 1, which tailgate is attached in an articulated fashion to the bodywork of a vehicle by means of a hinge so as to be capable of pivoting.

In the arrangement which is embodied as a tailgate for a motor vehicle, in each case a trim element 3 is arranged on each side of the window pane 2, and is connected in a materially joined and/or frictionally locking fashion to the window pane 2 in the way described above. The two trim elements 3 are embodied and arranged in a mirror-inverted fashion in this case.

First Exemplary Embodiment

Figure 2:
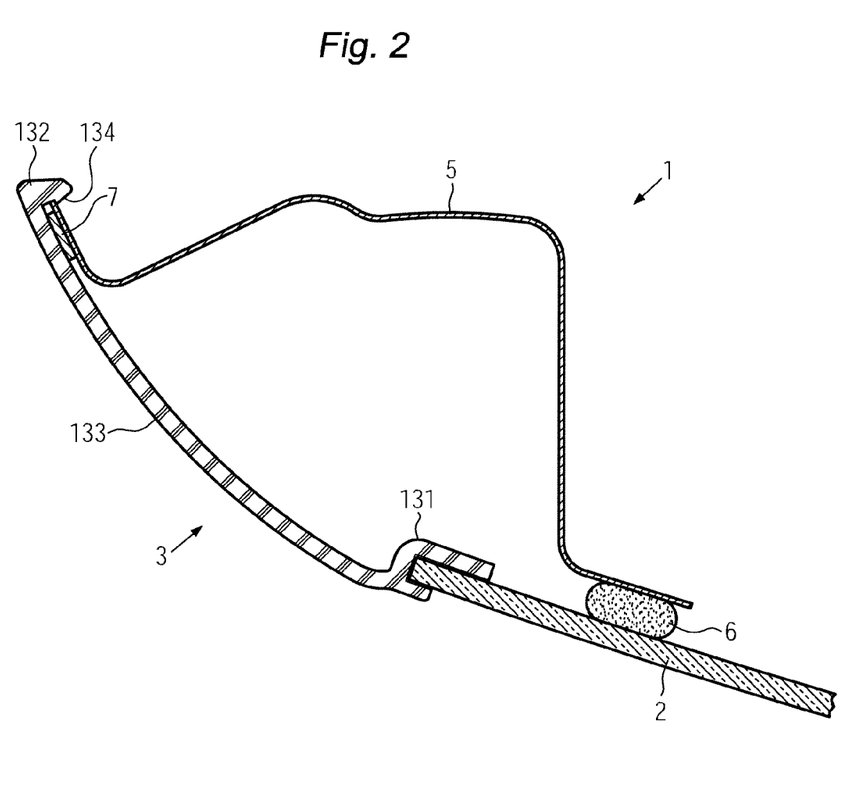
FIG. 2 shows the section E-E from FIG. 1 illustrating the window arrangement according to the invention in accordance with the first exemplary embodiment.

A first exemplary embodiment of the invention will be described below with reference to FIGS. 1 and 2.

The first exemplary embodiment of the invention comprises a connecting section 131 of the first variant, an attachment section 132 of the first variant and a main section 133 of the first variant.

The first variant of the connecting section 131 relates to the variant which is integrally injection molded on. In this context, the trim element 3 is integrally injection molded on to the side of the window pane with the result that the connecting section 131 engages around the edge of the window pane 2 with the result that two limbs of the connecting section 131 extend along the window pane 2 on opposite sides of the window pane 2. The limbs of the connecting section 131 are of different lengths in the illustrated embodiment, with the limb which is to face the passenger compartment of the vehicle being made longer (for example 70 mm overlap with the window pane 2) than the limb which is to be arranged on an outer side of the vehicle (for example 30 mm overlap with the window pane 2). The configuration and in particular the length of the limbs can vary depending on the injection mold used.

The first variant of the attachment section 132 has, on a side which is to face the passenger compartment of the vehicle, an integrally molded on, sprung attachment means with a latching projection which can be latched onto the vehicle structure 5. The latching projection of the sprung attachment means can be deflected with respect to the vehicle structure 5 by applying pressure to the attachment section 132.

The first variant of the main section 133 is embodied in such a way that the outer surfaces of the connecting section 131 and of the main section 133 merge with one another in an essentially flush fashion. This ensures that the trim element 3 is connected to the window pane 2 in a visually and esthetically appealing fashion. The main section 133 describes, in cross section, an arcuate segment with an arc length of approximately 30° to 60°.

A method for manufacturing the window arrangement 1 according to the first exemplary embodiment of the invention will be explained below:

A window pane 2 is prepared. Before the trim element 3 is integrally injection molded on, edge-side region of the window pane 2, on which the trim element 3 is to be integrally molded, is provided locally with a primer or adhesion promoter in order to improve the adhesion between the window pane 2 and the trim element 2. The primer is symbolically represented by a dashed line. The pretreated window pane 2 is placed in an injection mold and the injection mold is closed. A plastic which can be processed with an injection molding method is injected into the injection mold and hardened. In the process, the trim element 3 is integrally molded or injection molded onto the window pane 2 with the result that the trim element 3 and the window pane 2 are connected in a materially joined fashion.

After the trim element 3 has been integrally molded on, the window arrangement 1 is secured to the vehicle structure 5. The window pane 2 is bonded to the vehicle structure 5 by means of a bead 6 of adhesive, i.e. is connected in a materially joined fashion to the vehicle structure 5.

The trim element 3 is latched or clipped onto the vehicle structure 5 by applying pressure to the attachment section 132 with the result that the trim element 3 and the vehicle structure 5 are connected in a positively locking fashion. After a latching edge of the vehicle structure 5 has been overcome, the spring nose 134 of the attachment means latches in a corresponding position in order to engage behind the vehicle structure 5 in a positively locking fashion, as is illustrated in FIG. 2. In addition, the attachment section 132 of the trim element 3 is bonded to the vehicle structure 5 by means of a double-sided adhesive strip 7, with the result that the trim element 3 and the vehicle structure 5 are connected in a materially joined fashion. The double-sided adhesive strip is attached in advance to faces of the attachment section 132 and/or of the vehicle structure 5 which are to be connected.

Second Exemplary Embodiment

Figure 3:
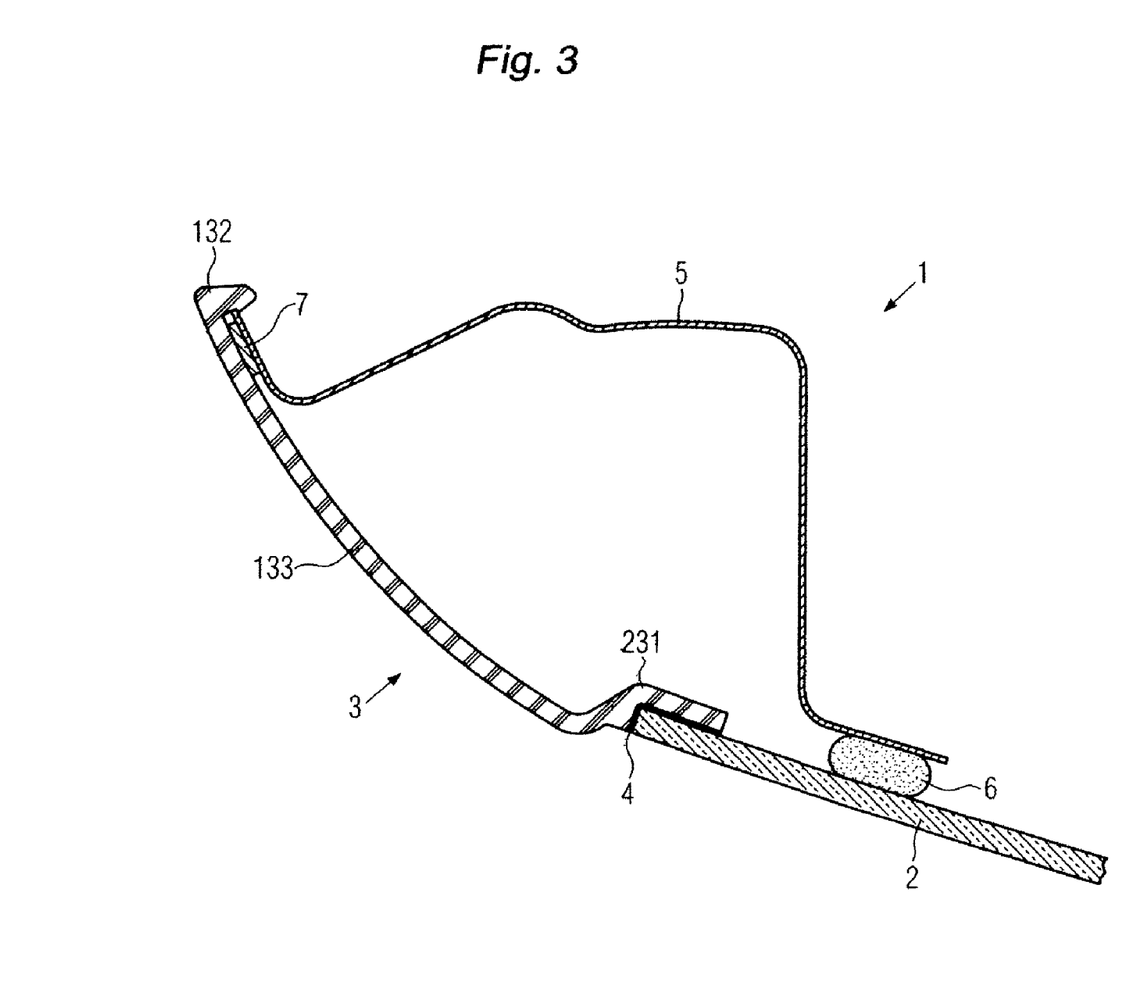
FIG. 3 shows the section E-E from FIG. 1 illustrating the window arrangement according to the invention in accordance with the second exemplary embodiment.

A second exemplary embodiment of the invention will be described below with reference to FIGS. 1 and 3.

The second exemplary embodiment of the invention comprises a connecting section 231 of the second variant, an attachment section 132 of the first variant and a main section 133 of the first variant.

The second variant of the connecting section 231 relates to the bonded on variant. In this context, a prefabricated trim element 3 composed of plastic (injection molded component) or metal is bonded to the window pane 2, preferably by means of an adhesive, or connected to the window pane 2 in a materially joined fashion. In this context, the trim element 3 is bonded laterally onto the window pane and is embodied in such a way that a limb of the connecting section 231 extends along the window pane 2 on a side of the window pane 2 which is to face the passenger compartment of the vehicle, and the outer surface of the window pane 2 merges with the outer surface of the trim element 3 in a flush fashion.

The method for manufacturing the window arrangement 1 according to the invention in accordance with the second embodiment comprises the following steps: preparation of the window pane 2, preparation of the trim element 3 with the result that the trim element 3 is arranged on the edge of the window pane 2, application of an adhesive 4 as an adhesive layer to one or to both of the faces of the trim element 3 and of the window pane 2 which are to be connected, and joining of the faces of the trim element 3 and of the window pane 2 which are to be connected and pressing of said faces against one another with the result that the trim element 3 and the window pane 2 are connected in a materially joined fashion.

After the window arrangement 1 has been manufactured, the window arrangement 1 is secured to the vehicle structure 5 in the way described above. The window pane 2 and the trim element 3 are connected in a materially joined fashion, preferably bonded by means of the bead 6 of adhesive, with the trim element 3 and the vehicle structure 5 being connected in a positively locking and materially joined fashion.

Third Exemplary Embodiment

Figure 4:
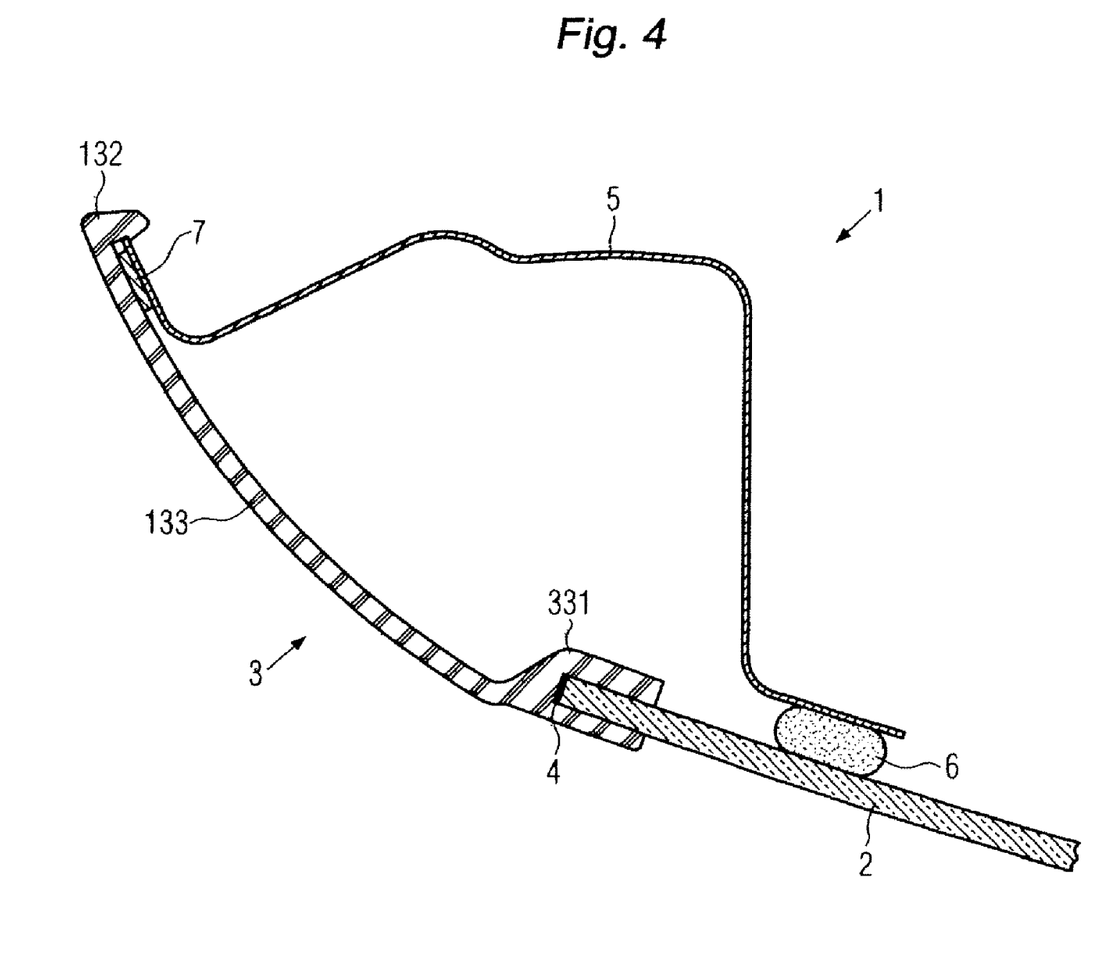
FIG. 4 shows the section E-E from FIG. 1 illustrating the window arrangement according to the invention in accordance with the third exemplary embodiment.

A third exemplary embodiment of the invention will be described below with reference to FIGS. 1 and 4.

The third exemplary embodiment of the invention comprises a connecting section 331 of the third variant, an attachment section 132 of the first variant and a main section 133 of the first variant.

The third variant of the connecting section 331 relates to the plugged on variant. In this context, a prefabricated trim element 3 composed of plastic (injection molded component) or metal is plugged onto the edge of the window pane 2 with the result that the connecting section 331 engages around the edge of the window pane 2, in which case two limbs of the connecting section 331 extend along the window pane 2 on opposite sides of the window pane 2, and the window pane 2 is clamped tight by the limbs with the result that the trim element 3 and the window pane 2 are connected in a frictionally locking fashion. The limbs of the connecting section 331 are of equal length in the illustrated embodiment (for example 70 mm overlap with the window pane 2) and form a plug-on groove, in which case the limb which is to face the passenger compartment of the vehicle is made somewhat thicker than the limb which is to be arranged on an outer side of the vehicle. The embodiment and in particular the length of the limbs can, however, also be different from that described. An adhesive, preferably a liquid adhesive, is introduced into the groove base of the receptacle or plug-on groove formed between the limbs of the connecting section 331 (illustrated on the front face of the window pane 2) with the result that the window pane 2 and the trim element 3 are additionally also connected in a materially joined fashion.

The method for manufacturing the window arrangement 1 according to the invention in accordance with the third exemplary embodiment comprises the following steps: preparation of the window pane 2; preparation of the trim element 3; introduction of a liquid adhesive 4 into the receptacle (plug-on groove) defined between the two limbs of the connecting section 331; plugging on of the trim element 3 with the result that the connecting section 331 engages around the edge of the window pane 2 and the two limbs of the connecting section 331 extend along the window pane 2 on opposite sides of the window pane 2 and the window pane 2 is clamped tight by the limbs; and hardening of the adhesive 4 in order to connect the window pane 2 and the trim element 3 by means of the adhesive 4 in a materially joined fashion.

Alternatively, the adhesive 4 is applied to the front face of the window pane 2. The trim element 3 and the window pane 2 are subsequently joined with the result that the trim element 3 and the window pane 2 are connected in a materially joined fashion.

After the window arrangement 1 has been manufactured, the window arrangement 1 is secured to the vehicle structure 5 in the way described above. The window pane 2 and the trim element 3 are connected in a materially joined fashion, preferably bonded by means of the bead 6 of adhesive, with the trim element 3 and the vehicle structures being connected in a positively locking and materially joined fashion.

Fourth Exemplary Embodiment

Figure 5:
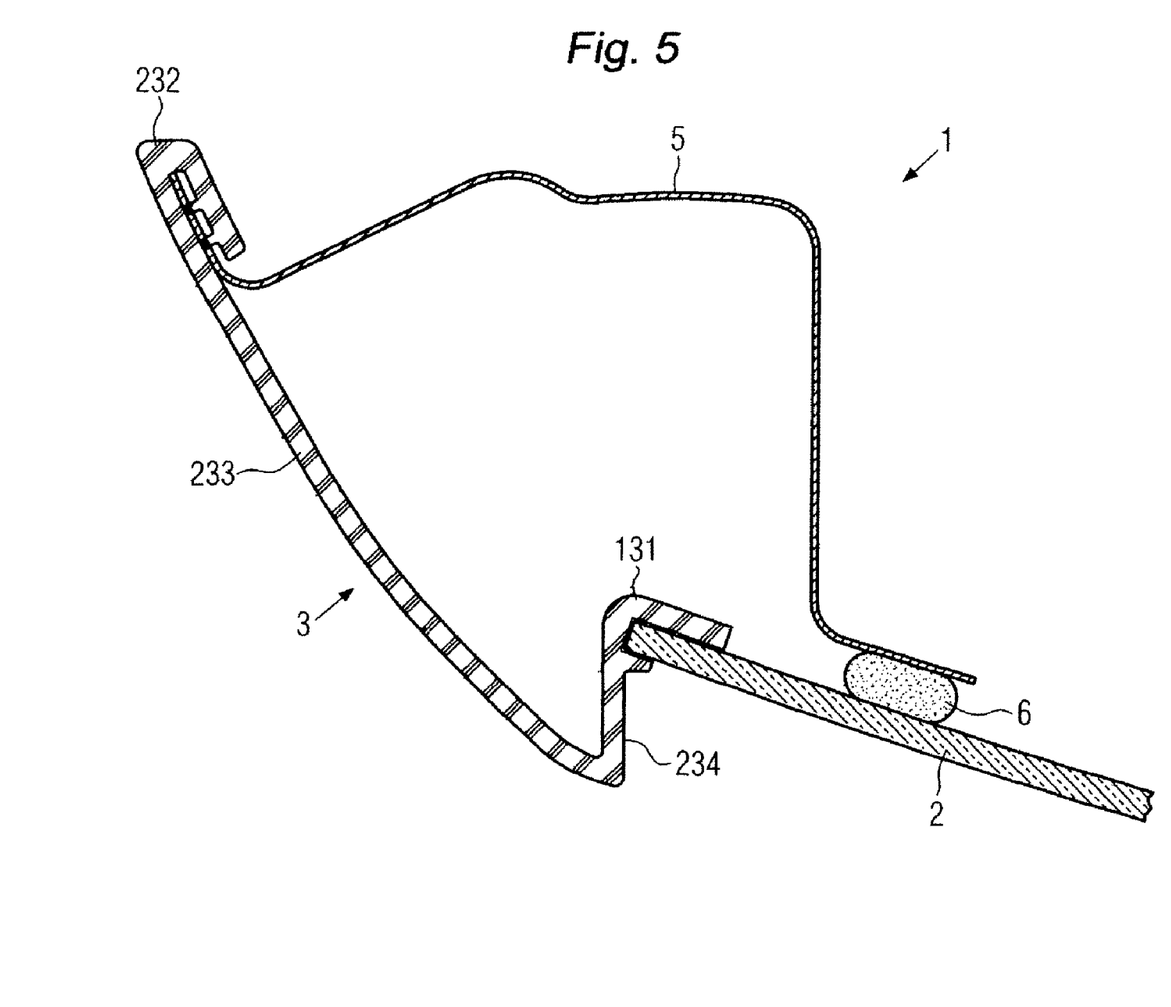
FIG. 5 shows the section E-E from FIG. 1 illustrating the window arrangement according to the invention in accordance with the fourth exemplary embodiment.

A fourth exemplary embodiment of the invention will be described below with reference to FIGS. 1 and 5.

The fourth exemplary embodiment of the invention comprises a connecting section 131 of the first variant, an attachment section 232 of the second variant and a main section 233 of the second variant.

The attachment section 232 of the second variant is embodied and can be arranged in such a way that it engages behind the vehicle structure 5 in a positively locking fashion. In this context, the attachment section 232 engages behind the vehicle structure 5 at the edge, in which case a limb of the attachment section 232 extends along the vehicle structure 5 on a side of the vehicle structure 5 which is to face the passenger compartment of the vehicle, and the vehicle structure 5 is held tight by projections of the attachment section 232, integrally formed onto the limbs, in depressions or cutouts in the vehicle structure 5 with the result that the trim element 3 and the vehicle structure 5 are connected in a positively locking fashion.

The main section 233 of the second variant is embodied in such a way that a transition section 234, which is preferably aligned parallel to the longitudinal axis of the vehicle, extends between the connecting section 131 and the main section 233.

The transition section merges with the main section of the trim element at an acute angle and forms a sharp breakaway edge.

The window arrangement 1 is manufactured in the way described above and is secured to the vehicle structure 5.

Fifth Exemplary Embodiment

Figure 6:
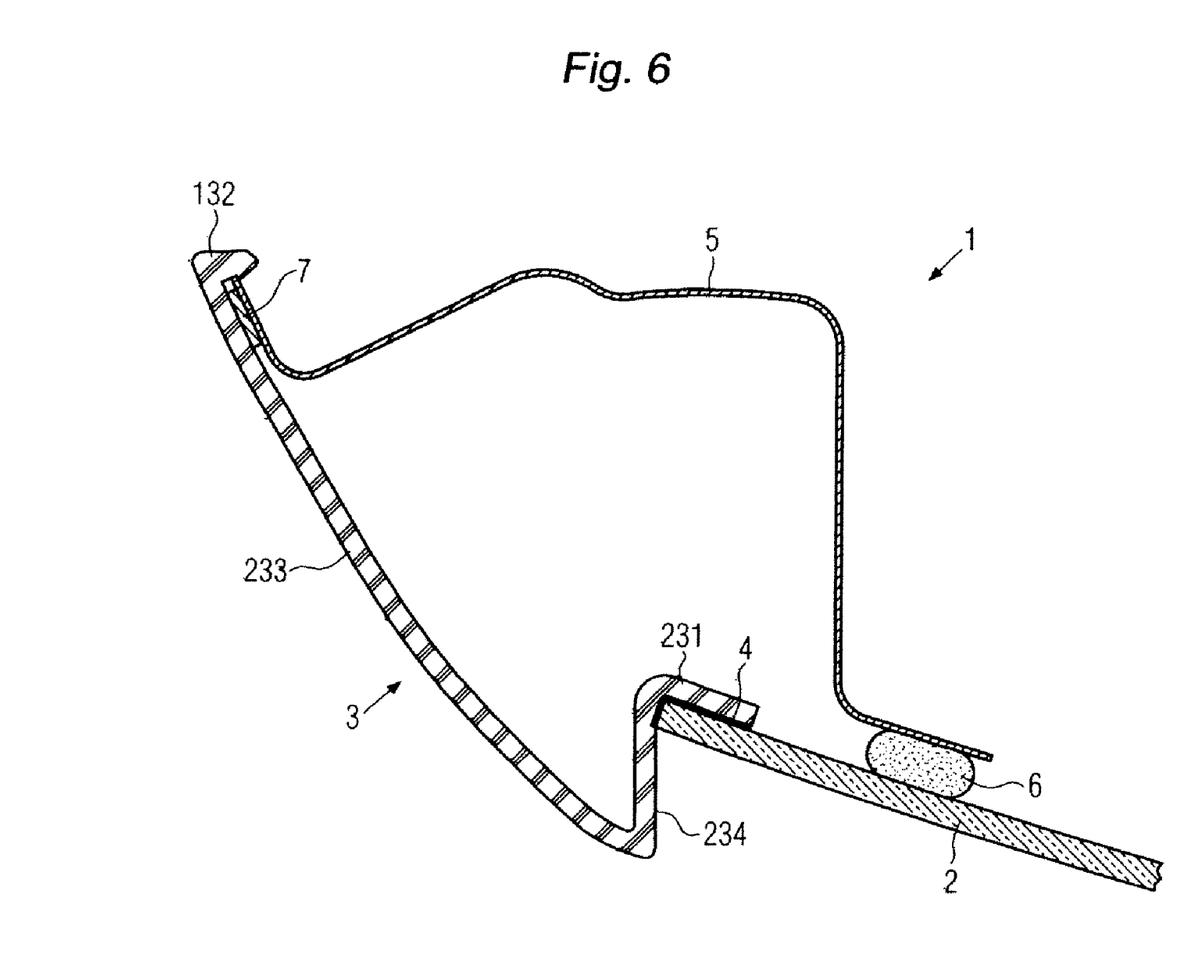
FIG. 6 shows the section E-E from FIG. 1 illustrating the window arrangement according to the invention in accordance with the fifth exemplary embodiment.

A fifth exemplary embodiment of the invention will be described below with reference to FIGS. 1 and 6.

The fifth exemplary embodiment of the invention comprises a connecting section 231 of the second variant, an attachment section 132 of the first variant, a main section 233 of the second variant and a transition section 234 of the second variant.

The window arrangement 1 is manufactured in the way described above and secured to the vehicle structure 5.

Sixth Exemplary Embodiment

Figure 7:
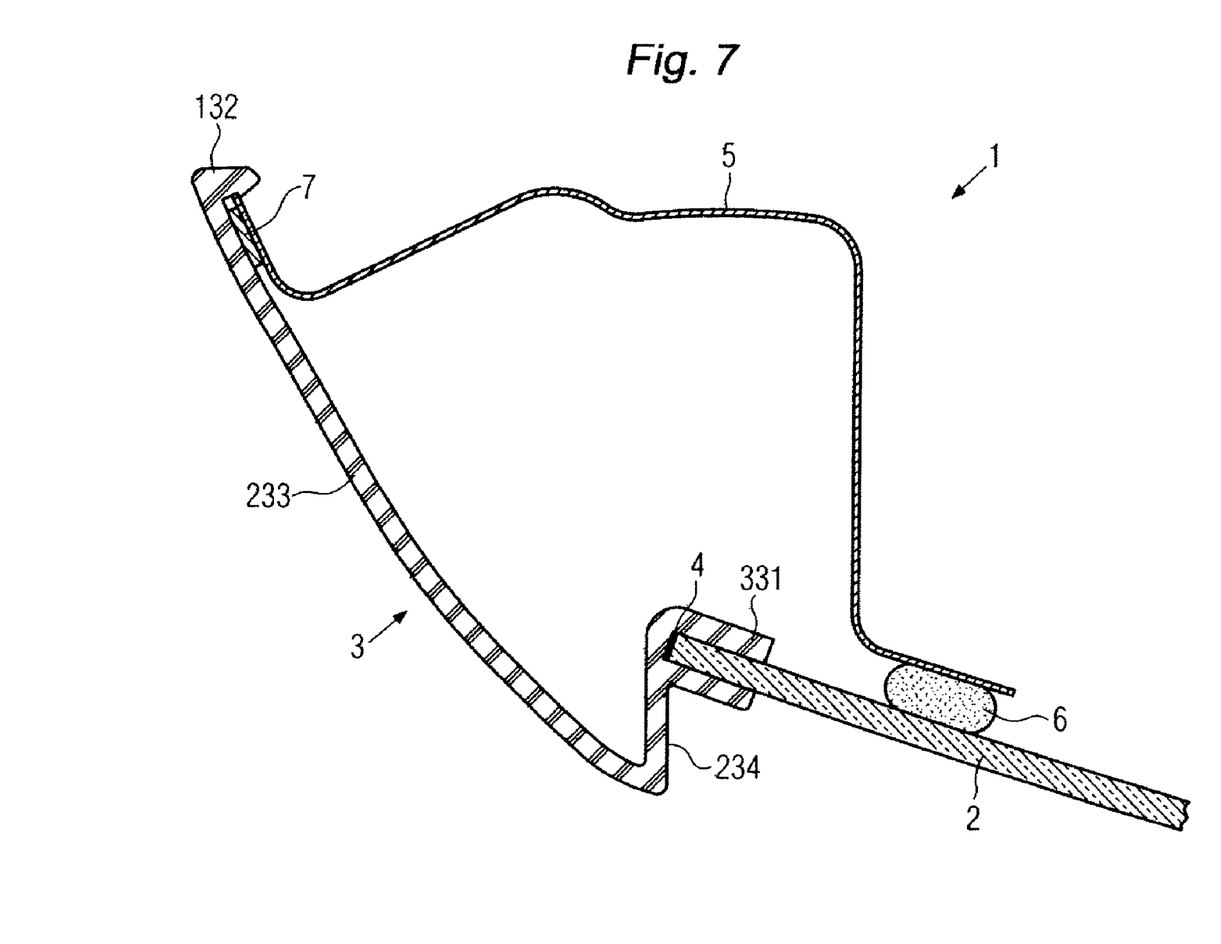
FIG. 7 shows the section E-E from FIG. 1 illustrating the window arrangement according to the invention in accordance with the sixth exemplary embodiment.

A sixth exemplary embodiment of the invention will be described below with reference to FIGS. 1 and 7.

The sixth exemplary embodiment of the invention comprises a connecting section 331 of the third variant, an attachment section 132 of the first variant, a main section 233 of the second variant and a transition section 234 of the second variant.

Figure 8:
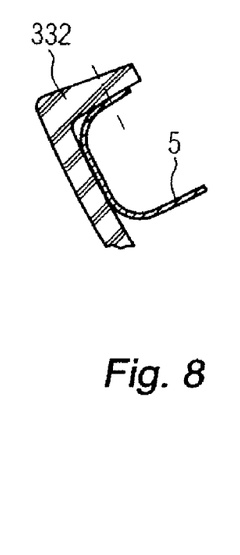
FIG. 8 shows an alternative connection of the trim element to the vehicle structure.

An attachment section 332 of the third variant will be explained with reference to FIG. 8. The attachment section 332 of the third variant forms a flange and extends essentially at a right angle to the main section 233. The attachment section 332 can be aligned parallel to the inside of the vehicle. The vehicle structure component 5 has, in the region which is to be connected to the trim element 3, a shape or contour which is essentially matched to the trim element 3 and simultaneously can be placed in abutment over a surface with the attachment section 332 and the main section 233. The vehicle structure component 5 is screwed or riveted to the attachment section 332 with the result that the trim element 3 and the vehicle structure 5 are connected in a positively locking fashion.

The window arrangement 1 is manufactured in the way described above and secured to the vehicle structure 5.

The different variants of the connecting section 131, 231, 331, of the attachment section 132, 232, 332 and of the main section 133, 233 can be combined as desired.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A window arrangement for a motor vehicle, comprising:
a window pane; and
a plurality of trim elements, each trim element arranged in an area of a lateral edge of the window pane, wherein the trim elements and the window pane are connected to one another in a materially joined fashion and wherein the trim elements are integrally molded on to the window pane, wherein each of the trim elements is embodied in one piece and includes:

a connecting section connected to the window pane, an attachment section connected to a vehicle structure, and a main section extending between the connecting section and the attachment section, wherein the cross section of the main section extends in an arcuate shape such that the trim element forms an aerodynamically favorable transition between lateral paneling of the vehicle and the window pane, and wherein the arcuate shape has approximately a 30 degree to 90 degree arc length.

2. The window arrangement as claimed in claim 1, wherein the trim elements are integrally injection molded on to the window pane.

3. The window arrangement as claimed in claim 1, wherein the trim elements are bonded onto the window pane.

4. The window arrangement as claimed in claim 1, wherein the trim elements are plugged onto the window pane.

5. The window arrangement as claimed in claim 1, wherein an outer surface of the window pane is substantially flush with an outer surface of each of the trim elements.

6. The window arrangement as claimed in claim 1, wherein the connecting section is configured to engage the edge of the window pane such that limbs of the connecting section extend along the window pane on opposite sides of the window pane.

7. The window arrangement as claimed in claim 6, wherein the limbs of the connecting section are of approximately equal length.

8. The window arrangement as claimed in claim 6, wherein an adhesive is introduced into a receptacle formed between the limbs of the connecting section.

9. The window arrangement as claimed in claim 1, wherein the attachment section is secured to the vehicle structure in a positively locking and/or materially joined fashion.

10. The window arrangement as claimed in claim 9, wherein the attachment section has a sprung attachment device configured to be latched to the vehicle structure.

11. The window arrangement as claimed in claim 9, wherein the attachment section is configured to engage behind the vehicle structure in a positively locking fashion.

12. The window arrangement as claimed in claim 1, wherein an outer surface of the connecting section is substantially flush with an outer surface of the main section.

13. The window arrangement as claimed in claim 1, wherein each of the trim elements further include a transition section aligned parallel to the longitudinal axis of the vehicle and extending between the connecting section and the main section.

14. The window arrangement as claimed in claim 13, wherein the transition section merges with the main section of the trim element at an acute angle and forms a breakaway edge.

15. An arrangement for a motor vehicle, comprising:

a window arrangement as claimed in claim 1 and a vehicle structure component, wherein the window pane and the vehicle structure component are connected in a materially joined fashion, and wherein the trim elements and the vehicle structure component are connected in a positively locking and/or materially joined fashion.

16. The arrangement for a vehicle as claimed in claim 15, wherein the window pane and the vehicle structure component are bonded with an adhesive, and wherein the trim elements engage behind the vehicle structure component in a positively locking fashion, and/or the trim elements and the vehicle structure component are connected with a double-sided adhesive strip.

17. The arrangement as claimed in claim 15, wherein the arrangement is a tailgate for the vehicle and wherein there are two trim elements arranged laterally on the window pane and connected to the window pane in a materially joined fashion.

18. The arrangement as claimed in claim 17, wherein the trim elements are arranged in a mirror-inverted fashion.

* * * * *